Feb. 20, 1934.     C. W. KANOLT     1,947,555
MECHANISM FOR MOVING CAMERA PLATES OR SHUTTERS
Filed May 23, 1930     3 Sheets-Sheet 1

INVENTOR
Clarence W. Kanolt
BY
Harry Lea Dodson
ATTORNEY

Feb. 20, 1934.     C. W. KANOLT     1,947,555
MECHANISM FOR MOVING CAMERA PLATES OR SHUTTERS
Filed May 23, 1930     3 Sheets-Sheet 2

INVENTOR
*Clarence W. Kanolt*
BY
*Harry Lea Dodson*
ATTORNEY

Feb. 20, 1934.  C. W. KANOLT  1,947,555
MECHANISM FOR MOVING CAMERA PLATES OR SHUTTERS
Filed May 23, 1930  3 Sheets-Sheet 3

INVENTOR
Clarence W. Kanolt
BY
Harry Lea Dodson
ATTORNEY

Patented Feb. 20, 1934

1,947,555

UNITED STATES PATENT OFFICE 1,947,555

MECHANISM FOR MOVING CAMERA PLATES OR SHUTTERS

Clarence W. Kanolt, New York, N. Y.

Application May 23, 1930. Serial No. 454,864

9 Claims. (Cl. 88—16)

My invention is designed for use on cameras for the taking of pictures in accordance with my United States Patent No. 1,260,682, issued March 26, 1918. Such pictures I designate as depthograph pictures, the word "Depthograph" being a trade name which I have coined for describing them, and which is protected as a trademark by certificate of registration No. 261,335, issued September 17, 1929.

My invention relates more specifically to mechanism for moving the plates carried by the plate-holders described in my Patent No. 1,900,566, and for synchronizing the movement of said plates with the camera-driving mechanism, described in my copending application, Serial No. 454,865, in which the speed of the flexible shaft for actuating the plate-holder mechanism is properly synchronized with the camera-moving mechanism, and to synchronize the mechanism which operates the plate-holder, with an automatic shutter, so as to insure the proper opening and closing of the shutter.

My invention has for its principal object, to provide a device in which the shutter-actuating mechanism will be synchronized with the plate-moving mechanism, it being desirable that the shutter close slightly before the plate-holder has reached the end of its motion, in order to prevent successive picture strips in the negative being run together slightly at their edges.

A concrete embodiment of my invention is illustrated in the accompanying drawings, which are to be considered as a part of this specification, in which—

Similar reference numerals refer to similar parts throughout the entire description.

Figure 6:
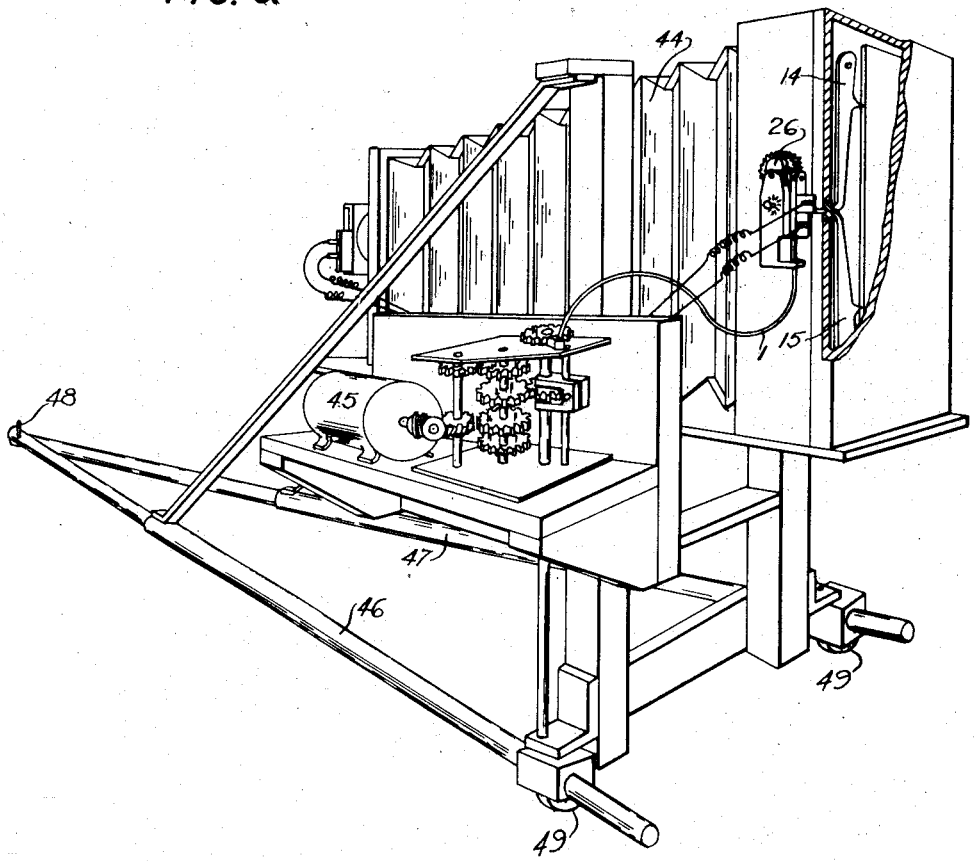
Fig. 6 is an assembled view of the camera showing my invention attached to it.

As shown in the drawings, the mechanism for actuating the shutter and the plate-holder is actuated by a flexible shaft 1, the other end of which is connected to the mechanism for driving the camera 44, as described in my copending application, Serial No. 454,865. The shaft 1 is provided with a plurality of gears clearly seen in Fig. 6, the gears being driven by an electric motor 45, and the supported camera is on legs which are carried by a frame comprising two rods 46 and 47 which are secured to a pivot 48, rollers 49 being provided for convenient movement of the camera about the pivot 48. The mechanism for moving the camera is fully described in my copending application above referred to.

Figure 4:
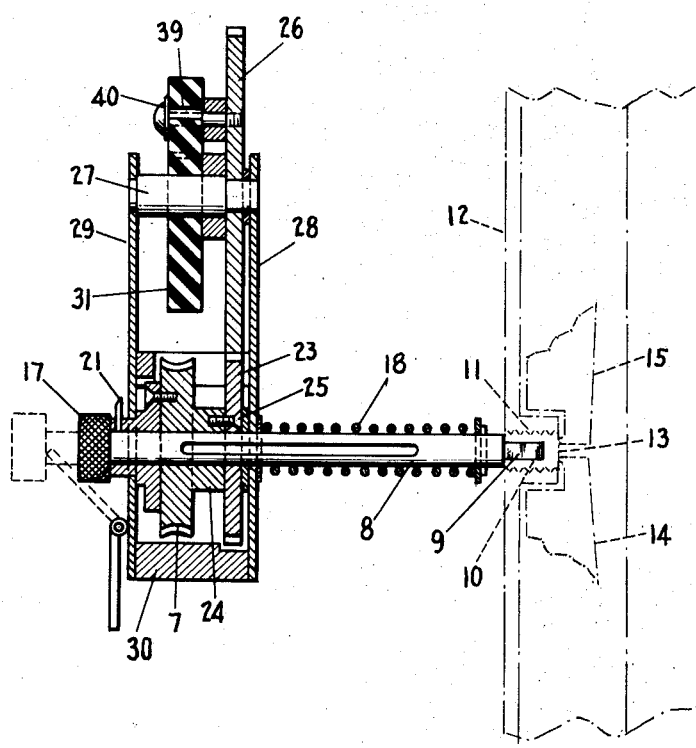
Fig. 4 is a vertical sectional view of the device for operating the mechanism of the plate pusher.
Figure 5:
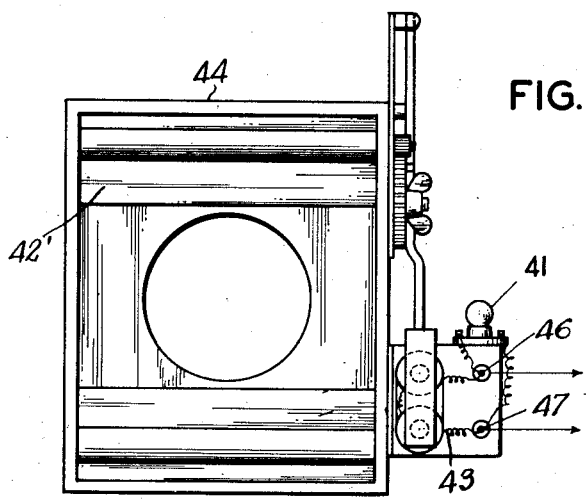
Fig. 5 is a detail view of the mechanism for operating the shutter.

The flexible shaft 1 is enclosed in a casing 2, the end 3 of the shaft 1 abutting the end 4 of a shaft 5, which carries a worm 6, which engages a worm gear 7, mounted upon a shaft 8. The outer end 9 of this shaft 8 is squared, and fits a socket or recess 10 in a screw 11, mounted in a side-frame 12 of a plate-holder, shown in dotted lines in Fig. 4. The inner end 13 of the screw 11 engages levers 14 and 15 on the plate-holder, only fragmentary portions of said levers 14 and 15 being shown, as the plate-holder and its mechanism are fully described in my Patent No. 1,874,047.

The worm gear 7 is splined on the shaft 8 by means of a key 16, so that the shaft 8 can be drawn back by means of a handle 17 formed on its outer end, to permit the plate-holder to be inserted in the back of the camera. After the insertion of the plate-holder, the shaft 8 is moved forward until its end 9 enters the socket 10 in the screw 11, mounted in the side-frame 12 of the plate-holder. A compression spring 18 is provided, to move the shaft 8 back into position when it has been withdrawn, as indicated by the dotted lines in Fig. 4.

Figure 3:
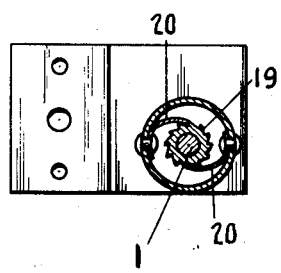
Fig. 3 is a cross-section, taken on the line 3—3 in Fig. 1.

As clearly shown in Fig. 3, I provide a ratchet mechanism, comprising a standard form of ratchet 19 and pawls 20, to permit the camera back mechanism to be turned by hand, for the purpose of adjusting same to proper initial position before exposure is made. When the flexible shaft 1 is turned, it drives the camera back mechanism through this ratchet device; but the latter device can be turned in a forward direction by hand without the operation of the flexible shaft 1. This ratchet device is rarely used, being provided more for convenience than necessity, for the adjustment of the camera back mechanism to proper initial position can easily be accomplished by running the motor 45 for a short time, while the camera stand is raised from contact with the floor so that it will not be subjected to movement.

Adjacent the outer end of the shaft 8 is mounted a pointer 21, which indicates on a scale 22 how much the shaft 8 is rotated. As shown, one division of the scale 22 represents movement of the photographic plate a distance of .001 of an inch.

Upon the shaft 8, adjacent the worm gear 7, I mount a spur gear pinion 23, which may be secured to the hub 24 of the worm gear 7 by means of screws 25, or in any other suitable or convenient manner. This pinion 23 meshes with a gear 26. This gear 26 has twice as many teeth as the pinion 23, and consequently turns only one-half as rapidly. The gear 26 is carried by a shaft 27, suitably journaled in plates 28 and 29, secured to a block 30, which is attached to the under side of the camera back mechanism, though it may be secured in any other suitable or convenient manner. Upon the gear 26 is mounted a cam 31, which is provided with projections 32 and 33, designed to actuate a spring 34, which will close electrical contacts 35 and 36, to convey current through binding posts 37 and 38 to electrical conductors which lead to the shutter-moving mechanism 43. I have not illustrated the shutter mechanism, as this is a known construction, being operated by means of a solenoid, which will open the shutter shortly after the camera commences to move, and will close after the camera has moved through the required distance. After the spring on the shutter has been set, the first closing of the electrical contacts 35 and 36 will cause current to pass through the solenoid or electro-magnet and open the shutter, and the second closing of the contacts 35 and 36 will send current through the magnet or solenoid 43, which will close the shutter 42', this mechanism being well known, and obvious to persons skilled in the art.

Figure 1:
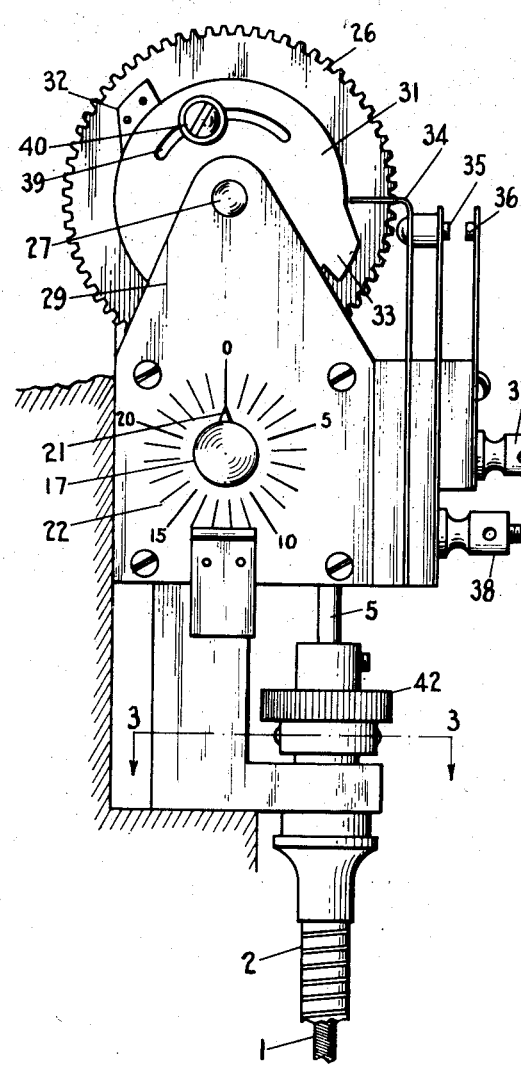
Fig. 1 is a side elevation of my improved device.
Figure 2:
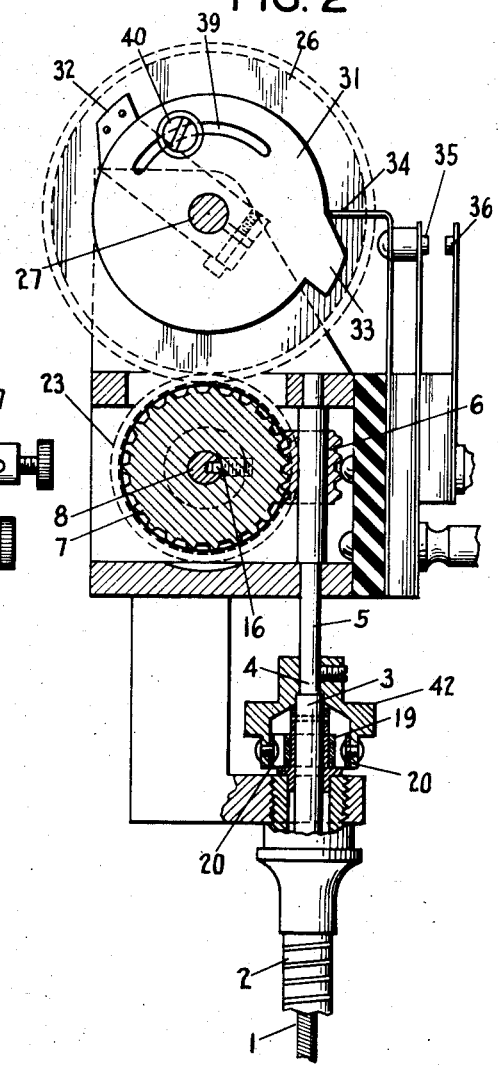
Fig. 2 is a similar view, partly in section.

Provision is made for adjusting the projections 32 and 33 on the cam 31 independently. The projection 33 is preferably formed integral with the cam 31 and it has a limited adjustment relative to the position of gear 26, by means of an arcuate slot 39, a screw 40 being provided to lock the cam 31 in position when the required adjustment has been made. Projection 32 is formed by the end of an arm which is fixedly secured to the shaft 27 by means of a bolt which engages the slotted ends of the arm as clearly seen in Fig. 2. This construction provides for an adjustment of almost 360° of the projection 32, for by loosening the bolt it will be obvious that the arm and in turn the projection 32 can be swung about the shaft 27 into any desired position in which it can be locked by the tightening of the bolt. Preferably a block of insulating material is riveted to the outer end of the arm. The projections 32 and 33 are commonly adjusted so that when the shutter 42' opens the pointer 21 is at zero, and when the shutter is closed by the second projection on the cam 31, the pointer 21 will have made one revolution and will again be approximately at zero point, although, as before stated, it is desirable to adjust these projections 32 and 33 so that the shutter 42' will close slightly before the pointer 21 has reached zero point on the scale 22, which is done in order to prevent the successive picture strips on the negative being run together slightly at the edges.

A battery lamp 41 is shunted across the magnet terminals 46 and 47 so that it will light when the current is turned on. This serves as a warning, and to prevent constant waste of current when the machine is not in operation, and is a convenient way to avoid exhaustion of the battery used to furnish current to actuate the solenoid.

A casing 42 is provided, surrounding the ends of the shafts 1 and 5, the surface thereof being knurled to provide convenient means for actuating the mechanism of ratchet 19 and pawls 20, when desired.

Having described my invention, what I regard as new, and desire to obtain by Letters Patent of the United States, is:

1. In a device of the character described, the combination, with a camera having a plate-holder, a shutter, mechanism to drive the camera through a predetermined arc of a circle, and a flexible shaft attached to and synchronizing with said driving mechanism, of a shaft secured to the end of said flexible shaft, a worm carried by said shaft, a worm gear engaged by said worm, a second shaft upon which said worm gear is splined, one end of said second shaft engaging means to move a photographic plate carried by the plate-holder, means to hold said second shaft normally in engagement with said plate-moving means, a spur gear pinion driven by said second shaft, a gear, the teeth of which are in mesh with the teeth of said pinion, an adjustable cam mounted on said gear, a scale mounted adjacent the end of said second shaft, a pointer on said second shaft to register with said scale, a spring adapted to be engaged by said cam, electrical contacts actuated by said spring, binding posts connected to said contacts, an electro-magnet adapted to actuate the shutter on said camera, and electrical conductors to connect said magnet to said binding posts.

2. In a device of the character described, the combination, with a camera having a plate holder, a shutter, mechanism to drive the camera through a predetermined arc of a circle, and a flexible shaft attached to and synchronizing with said driving mechanism, of a shaft secured to the end of said flexible shaft, a worm carried by said shaft, a worm gear engaged by said worm, a second shaft to which said worm gear is attached, said shaft engaging a screw mounted in the plate-holder carried by the camera, a spring to hold said second shaft normally in engagement with said screw, a spur gear pinion driven by said second shaft, a gear, the teeth of which are in mesh with the teeth of said pinion, an adjustable cam mounted on said gear, a scale mounted adjacent the end of said second shaft, a pointer on said second shaft to register with said scale, and means actuated by said cam to open and close the shutter of the camera.

3. In a device of the character described, the combination, with a camera having a plate-holder, a shutter, mechanism to drive the camera through a predetermined arc of a circle, and a flexible shaft attached to and synchronizing with said driving mechanism, of a shaft secured to the end of said flexible shaft, a worm carried by said shaft, a worm gear engaged by said worm, a second shaft to which said worm gear is attached, engaging a screw mounted in the plate-holder carried by the camera, a spring to hold said second shaft normally in engagement with said screw, a spur gear pinion driven by said second shaft, a gear, the teeth of which are in mesh with the teeth of said pinion, an adjustable cam mounted on said gear, a scale mounted adjacent the end of said second shaft, a pointer on said second shaft to register with said scale, and electrically-operated means actuated by said cam to open and close the shutter of the camera.

4. In a device of the character described, the combination, with a camera having a plate-holder, a shutter, mechanism to drive the camera through a predetermined arc of a circle, and a flexible shaft attached to and synchronizing with said driving mechanism, of a shaft secured to the end of said flexible shaft, a worm carried by said shaft, a worm gear engaged by said worm, a second shaft upon which said worm gear is splined, one end of said second shaft engaging a screw mounted in a plate-holder carried by the camera, a spring to hold said second shaft normally in engagement with said screw, a spur gear pinion driven by said second shaft, a gear, the teeth of which are in mesh with the teeth of said pinion, an adjustable cam mounted on said gear, a scale mounted adjacent the end of said second shaft, a pointer on said second shaft to register with said scale, a second spring adapted to be engaged by said cam, electrical contacts actuated by said second spring, binding posts connected to said contacts, an electro-magnet adapted to actuate the shutter on said camera, and electrical conductors to connect said magnet to said binding posts.

5. In a device of the character described, the combination, with a camera having a plate-holder, a shutter, mechanism to drive the camera through a predetermined arc of a circle about the object to be photographed, and a flexible shaft attached to and synchronizing with said driving mechanism, of a shaft secured to the end of said flexible shaft, a worm carried by said shaft, a worm gear engaged by said worm, a second shaft upon which said worm gear is splined, said second shaft being movable longitudinally, one end of said second shaft engaging means to move a photographic plate carried by the plate-holder, spring means to hold said second shaft normally in engagement with said plate-moving means, means actuated by and synchronizing with said plate-moving means to open and close the shutter of the camera, and an indicator secured to said second shaft to record the movement of said plate-moving means on a scale mounted adjacent thereto.

6. In a device of the character described, the combination, with a camera having a plate-holder, a shutter, mechanism to drive the camera through a predetermined arc of a circle, and a flexible shaft attached to and synchronizing with said driving mechanism, of a shaft actuated by said flexible shaft to move through suitable mechanism, a photographic plate in the plate-holder carried by the camera, a worm driven by said shaft, a worm gear actuated by said worm, a shaft for said worm gear, a pinion secured to said worm gear, a gear, the teeth of which are in mesh with the teeth of said pinion, a cam which is provided with two projections mounted on said gear, one of said projections having a limited adjustment and the other an unlimited adjustment, a scale mounted adjacent the end of said second shaft, a pointer on said second shaft to register with said scale, a spring adapted to be engaged by said cam, electrical contacts actuated by said spring, binding posts connected to said contacts, an electro-magnet adapted to actuate the shutter on said camera, electrical conductors to connect said magnet to said binding posts, and an electric lamp shunted across said magnet terminals whereby said lamp is illuminated when current is flowing to the magnet.

7. In a device of the character described, the combination, with a camera having a plate holder, mechanism to drive the camera through a predetermined arc of a circle about the object to be photographed, and a flexible shaft attached to and synchronizing with said driving mechanism, of a shaft driven thereby, a worm on said shaft, a worm gear actuated by said worm, a shaft for said worm gear, a pinion secured to said worm gear, a gear, the teeth of which are in mesh with the teeth of said pinion, an adjustable cam, the projections of which are independently adjustable mounted on said gear, a scale mounted adjacent the end of said second shaft, a pointer on said second shaft to register with said scale to indicate the position of said projections and electrical contacts actuated by said cam projections.

8. In a device of the character described, the combination, with a camera having a plate-holder and mechanism to drive the camera through a predetermined arc of a circle, about the object to be photographed, of a means for transmitting synchronous motion from the driving mechanism to the plate holder, a cam wheel having two projections actuated by and synchronizing with said plate-moving means to open and close the shutter of the camera, one of said projections being on the cam wheel the other being adjustably mounted upon a shaft on which said cam is mounted, there being an arcuate slot in said cam, whereby it can be adjusted to vary the time of opening and closing the shutters, and means to lock said adjustment when made.

9. In a device of the character described, the combination with a camera having a plate-holder and mechanism to drive the camera through a predetermined arc of a circle about the object to be photographed, of means for transmitting synchronous motion from the driving mechanism to the plate-holder, means actuated thereby to move a photographic plate in the plate-holder carried by the camera, independently adjustable cam means actuated by and synchronizing with said plate-moving means to open and close the shutter of the camera, and indicia to record the movement of said plate-moving means carried on the means to move the plate.

CLARENCE W. KANOLT.